(12) United States Patent
Komatsu et al.

(10) Patent No.: US 11,608,139 B2
(45) Date of Patent: Mar. 21, 2023

(54) BICYCLE REAR DERAILLEUR

(71) Applicant: SHIMANO Inc., Sakai (JP)

(72) Inventors: Atsushi Komatsu, Sakai (JP); Satoshi Idogaki, Sakai (JP)

(73) Assignee: Shimano Inc., Sakai (JP)

( * ) Notice: Subject to any disclaimer, the term of this patent is extended or adjusted under 35 U.S.C. 154(b) by 627 days.

(21) Appl. No.: 16/410,276

(22) Filed: May 13, 2019

(65) Prior Publication Data

US 2020/0361565 A1 Nov. 19, 2020

(51) Int. Cl.
*B62M 9/122* (2010.01)
*B62M 25/08* (2006.01)

(52) U.S. Cl.
CPC ............ *B62M 9/122* (2013.01); *B62M 25/08* (2013.01)

(58) Field of Classification Search
CPC ...... B62M 25/08; B62M 9/122; B62M 9/132; B62M 9/125
USPC ..................................................... 474/80, 82
See application file for complete search history.

(56) References Cited

U.S. PATENT DOCUMENTS

| | | | |
|---|---|---|---|
| 4,077,485 A * | 3/1978 | Bonora | B62J 11/00 180/231 |
| 5,211,583 A * | 5/1993 | Endo | H01R 13/4368 439/491 |
| 5,213,548 A * | 5/1993 | Colbert | B62M 25/08 280/238 |
| 5,397,273 A * | 3/1995 | Ando | B62M 9/1248 474/82 |
| 5,480,356 A * | 1/1996 | Campagnolo | B62M 9/122 280/238 |
| 5,577,969 A * | 11/1996 | Watarai | B62M 9/122 474/78 |
| 6,162,140 A * | 12/2000 | Fukuda | B62M 9/122 474/70 |
| 6,244,415 B1 * | 6/2001 | Fujii | B62M 25/00 192/217 |
| 6,423,443 B1 * | 7/2002 | Tsuboi | B60K 1/04 429/98 |
| 6,453,262 B1 * | 9/2002 | Kitamura | B62M 25/00 324/160 |
| 6,558,180 B2 * | 5/2003 | Nishimoto | H01R 9/223 439/271 |

(Continued)

FOREIGN PATENT DOCUMENTS

EP 2865589 A1 4/2015

*Primary Examiner* — Henry Y Liu
(74) *Attorney, Agent, or Firm* — Alleman Hall Creasman & Tuttle LLP

(57) ABSTRACT

A bicycle rear derailleur includes a base member including a mounting portion configured to be attached to a bicycle frame, the mounting portion having a mounting opening through which a central axis of a hub axle passes in a mounting state of the bicycle rear derailleur. The mounting portion includes a single joint or is free of any joint. Also included is a movable member movably coupled relative to the base member and a linkage structure operatively connecting the movable member to the base member. Also included is at least one of a motor, a first wireless communication unit, and an electrical connector. The at least one of the motor, the first wireless communication unit, and the electrical connector are disposed on at least one of the base member, the movable member, and the linkage structure.

15 Claims, 12 Drawing Sheets

(56) References Cited

U.S. PATENT DOCUMENTS

| | | | | |
|---|---|---|---|---|
| 6,600,411 B2* | 7/2003 | Nishimoto | ............ | B62M 25/08 340/427 |
| 6,623,389 B1* | 9/2003 | Campagnolo | .......... | B62M 9/122 474/70 |
| 6,648,686 B2* | 11/2003 | Nishimoto | ........... | H01R 13/112 439/605 |
| 6,761,655 B2* | 7/2004 | Fukuda | ................. | B62M 9/122 474/102 |
| 6,843,741 B2* | 1/2005 | Fujii | ....................... | B62M 9/04 280/238 |
| 6,979,009 B2* | 12/2005 | Ichida | ................... | B62M 9/132 280/238 |
| 7,125,354 B2* | 10/2006 | Shahana | .............. | B62M 9/1242 474/82 |
| 7,306,531 B2* | 12/2007 | Ichida | ................... | B62M 9/122 474/70 |
| 7,341,532 B2* | 3/2008 | Ichida | ................... | B62M 9/132 474/70 |
| 7,373,232 B2* | 5/2008 | Guderzo | ............... | B62M 9/122 474/116 |
| 7,396,304 B2* | 7/2008 | Shahana | .............. | B62M 9/127 474/80 |
| 7,442,136 B2* | 10/2008 | Ichida | ................... | B62M 9/132 474/80 |
| 7,553,247 B2* | 6/2009 | Guderzo | ............... | B62M 25/08 474/70 |
| 7,704,173 B2* | 4/2010 | Ichida | ................... | B62M 9/132 474/82 |
| 7,762,916 B2* | 7/2010 | Ichida | ................... | B62M 9/132 474/82 |
| 7,980,974 B2* | 7/2011 | Fukuda | ................. | B62M 25/08 474/70 |
| 8,025,597 B2* | 9/2011 | Takamoto | ............ | B62M 9/122 474/70 |
| 8,137,223 B2* | 3/2012 | Watarai | ................. | B62M 9/126 474/110 |
| 8,241,158 B2* | 8/2012 | Ishikawa | ............... | B62M 25/08 474/80 |
| 8,282,519 B2* | 10/2012 | Ichida | ................... | B62M 9/132 474/82 |
| 8,655,561 B2 | 2/2014 | Kitamura | | |
| 8,721,495 B2* | 5/2014 | Kitamura | ............... | B62M 9/122 477/7 |
| 8,864,611 B2* | 10/2014 | Kuwayama | .......... | B62M 9/1344 474/80 |
| 8,882,122 B2* | 11/2014 | Emura | .................. | B62M 25/08 280/200 |
| 8,888,620 B2* | 11/2014 | Emura | .................. | B62M 9/135 474/80 |
| 8,909,424 B2* | 12/2014 | Jordan | .................. | H04W 74/08 701/36 |
| 8,979,683 B2* | 3/2015 | Katsura | ................. | B62M 9/122 474/80 |
| 9,037,368 B2* | 5/2015 | Miglioranza | ........ | F16H 61/0213 701/60 |
| 9,151,379 B2* | 10/2015 | Kuroda | ................. | B62K 23/06 |
| 9,381,974 B2* | 7/2016 | Katsura | ................. | B62M 9/132 |
| 9,573,652 B2* | 2/2017 | Kuwayama | ............ | B62M 9/132 |
| 9,676,444 B2* | 6/2017 | Shipman | ................ | B62M 9/122 |
| 9,676,446 B2* | 6/2017 | Pasqua | ................... | B62M 9/134 |
| 9,873,482 B2* | 1/2018 | Nishino | ................ | B62M 9/135 |
| 10,667,316 B1* | 5/2020 | Inoue | ................... | H04W 76/15 |
| 10,870,464 B2* | 12/2020 | Braedt | ................... | B62M 9/127 |
| 2002/0190173 A1* | 12/2002 | Fujii | ..................... | B62M 9/122 248/300 |
| 2004/0116222 A1* | 6/2004 | Shahana | ............... | B62M 9/125 474/82 |
| 2006/0058135 A1* | 3/2006 | Shahana | ............... | B62M 9/125 474/82 |
| 2006/0186631 A1* | 8/2006 | Ishikawa | ............... | B62M 25/08 280/260 |
| 2007/0037645 A1* | 2/2007 | Ishikawa | ............... | B62M 9/132 474/80 |
| 2009/0240858 A1* | 9/2009 | Takebayashi | .......... | B62M 25/08 710/110 |
| 2011/0320093 A1* | 12/2011 | Kitamura | ............... | B62M 25/08 701/51 |
| 2012/0322591 A1* | 12/2012 | Kitamura | .................. | B62J 6/06 474/80 |
| 2014/0087901 A1* | 3/2014 | Shipman | ............... | B62M 9/122 474/82 |
| 2014/0102237 A1* | 4/2014 | Jordan | ................. | H04W 74/08 74/473.12 |
| 2014/0114538 A1* | 4/2014 | Shipman | ............... | B62M 9/132 701/51 |
| 2015/0111675 A1* | 4/2015 | Shipman | ............... | B62M 9/122 474/82 |
| 2016/0185421 A1* | 6/2016 | Komatsu | ................ | B62M 9/12 701/2 |
| 2016/0221640 A1* | 8/2016 | Watarai | ................ | B62M 25/08 |
| 2016/0311491 A1* | 10/2016 | Watarai | ................ | H05B 47/19 |
| 2016/0311499 A1* | 10/2016 | Kasai | .................... | B62M 25/08 |
| 2017/0008465 A1* | 1/2017 | Kasai | .................... | B62M 25/08 |
| 2017/0066501 A1* | 3/2017 | Hilgenberg | ............ | B62M 9/122 |
| 2017/0096184 A1* | 4/2017 | Hara | ........................ | B62M 9/12 |
| 2017/0096185 A1* | 4/2017 | Hara | ......................... | B62J 1/08 |
| 2017/0101162 A1* | 4/2017 | Tachibana | ............. | B62M 25/08 |
| 2017/0113759 A1* | 4/2017 | Watarai | ................. | B62M 9/122 |
| 2017/0120983 A1* | 5/2017 | Komatsu | ................ | B62K 25/286 |
| 2017/0197685 A1* | 7/2017 | Braedt | .................. | B62M 9/121 |
| 2018/0178881 A1* | 6/2018 | Miglioranza | .......... | B62M 9/127 |
| 2018/0180640 A1* | 6/2018 | Miglioranza | ............. | G01P 3/66 |
| 2018/0229803 A1* | 8/2018 | Wesling | ................ | B62M 9/132 |
| 2018/0237104 A1* | 8/2018 | Pasqua | ................... | B62M 9/122 |
| 2018/0265169 A1 | 9/2018 | Braedt | | |
| 2018/0273139 A1* | 9/2018 | Shipman | ................ | B62M 9/126 |
| 2018/0274623 A1* | 9/2018 | Brown | ....................... | F16F 9/34 |
| 2018/0346058 A1* | 12/2018 | Brown | ....................... | F16F 7/06 |
| 2018/0354586 A1* | 12/2018 | Komatsu | ................ | B62M 9/122 |
| 2018/0370598 A1* | 12/2018 | Chang | ..................... | B62K 19/18 |
| 2019/0100279 A1* | 4/2019 | Brown | .................... | B62M 9/124 |
| 2019/0100280 A1* | 4/2019 | Brown | .................... | B62M 9/125 |
| 2019/0246437 A1* | 8/2019 | Chuang | ................. | H04W 76/10 |
| 2020/0156735 A1* | 5/2020 | Jordan | .................. | B62K 21/125 |
| 2020/0156739 A1* | 5/2020 | Van Druten | ........... | B62M 25/08 |
| 2020/0187279 A1* | 6/2020 | Suzuki | ................ | H04W 52/028 |
| 2020/0189688 A1* | 6/2020 | Rodgers | ................ | B62M 9/122 |
| 2020/0223513 A1* | 7/2020 | Ho | .............................. | H01H 9/06 |
| 2020/0231249 A1* | 7/2020 | Ho | ........................... | B62M 9/132 |
| 2020/0247504 A1* | 8/2020 | Ho | ........................... | B62M 9/132 |

* cited by examiner

BICYCLE REAR DERAILLEUR

BACKGROUND

Whether for racing, sport, leisure, or transportation, bicycling is widely popular. Improvements to bicycle functionality may benefit a rider in the use of a bicycle while enhancing the cycling experience. As shifting mechanisms have become standard for bicycles, fine tuning these mechanisms to the applied use of the bicycle is a continuing endeavor. Front and rear derailleurs may benefit from designs that optimize the shifting mechanism and meet the needs of a given bicycle and rider. It may be advantageous to design derailleurs to accommodate current bicycle frames, wheels, axles, and the like, depending on the use of the bicycle for road or off-road. Reducing the complexity of bicycle repairs may also be advantageous for bicycle users.

SUMMARY

A bicycle rear derailleur developed is disclosed herein. In accordance with a first aspect of the present invention, the bicycle rear derailleur comprises a base member, a movable member, a linkage structure, and at least one of a motor, a first wireless communication unit, and an electrical connector. The base member includes a mounting portion configured to be attached to a bicycle frame. The mounting portion has a mounting opening through which a central axis of a hub axle passes in a mounting state of the bicycle rear derailleur. The mounting portion includes a single joint or is free of any joint. The movable member movably couples relative to the base member. The linkage structure operatively connects the movable member to the base member. The at least one of the motor, the first wireless communication unit, and the electrical connector is disposed on at least one of the base member, the movable member, and the linkage structure.

With the bicycle rear derailleur according to the first aspect, it is possible to mount a bicycle rear derailleur to a bicycle frame with a stronger attachment at the base member. This attachment style may better accommodate a through axle and provide a more supportive attachment between the bicycle frame and bicycle rear derailleur. A joint in the mounting portion may fix the bicycle rear derailleur in a position that is not possible to achieve if the mounting portion is free of any joint, and may allow for a more compact structure. The mounting portion may rigorously secure the bicycle rear derailleur so that at least one of a motor, a first wireless communication unit, and an electrical connector may be mounted on the bicycle rear derailleur. Therefore, the motor, the first wireless communication unit, and the electrical connector may not need to be mounted to other parts of the bicycle.

In accordance with a second aspect of the present invention, the bicycle rear derailleur according to the first aspect is configured so that a battery mounting portion is formed on at least one of the base member, the movable member, and the linkage structure.

With the bicycle rear derailleur according to the second aspect, it is possible to mount a battery for the electronic components of the bicycle on the rear derailleur, which may also be to power electronic derailleur control. A Therefore, the battery may be accommodated at the rear derailleur or remote from the rear derailleur with a connection to the battery mounting portion.

In accordance with a third aspect of the present invention, the bicycle rear derailleur according to the second aspect further comprises a battery configured to be disposed on the battery mounting portion.

With the bicycle rear derailleur according to the third aspect, it is possible to provide a battery on the rear derailleur for electronic derailleur control and to power other electronic components of the bicycle. The battery may not need to be accommodated on a frame of the bicycle if the battery is mounted at the rear derailleur.

In accordance with a fourth aspect of the present invention, the bicycle rear derailleur according to the third aspect is configured so that the battery and the electrical connector are interchangeably disposed on the battery mounting portion.

With the bicycle rear derailleur according to the fourth aspect, it is possible for a user of the bicycle to mount either a battery at the rear derailleur or an electrical connector that may connect with a battery that is remote from the rear derailleur. As such, electrically-powered components may be powered by the battery but at a location remote from the battery. Also, a USB port as the electrical connector may connect to the battery mounting portion or serve as a connector to a battery.

In accordance with a fifth aspect of the present invention, the bicycle rear derailleur according to any one of the first aspect to the fourth aspect further comprises a chain guide and a sensor. The chain guide is pivotally attached to the movable member. The sensor is configured to detect a position of the chain guide relative to the movable member.

With the bicycle rear derailleur according to the fifth aspect, it is possible to determine a position of the chain guide with the sensor. The sensor may be configured to detect at least one of a cadence, an inclination, a velocity, and/or an acceleration. Control of a position of the chain guide may be advantageous in different types of terrain or under different modes of operation of the bicycle as determined by the sensor.

In accordance with a sixth aspect of the present invention, the bicycle rear derailleur according to any one of the first aspect to the fifth aspect further comprises a controller configured to control at least one of the motor and the first wireless communication unit.

With the bicycle rear derailleur according to the sixth aspect, it is possible to adjust the bicycle rear derailleur via the controller to a position that may be advantageous to the use of the bicycle on different types of terrain and through varying riding conditions. The controller may control the motor to make position adjustments to the bicycle rear derailleur. The first wireless communication unit may receive input from the user controlling a remote component that directs a change in a position of the bicycle rear derailleur.

In accordance with a seventh aspect of the present invention, the bicycle rear derailleur according to any one of the first aspect to the sixth aspect is configured so that the mounting portion includes a first base portion and a second base portion spaced apart from a first base portion.

With the bicycle rear derailleur according to the seventh aspect, it is possible to utilize multiple base portions of the mounting portion to secure the mounting portion at the attachment point to the bicycle frame.

In accordance with an eighth aspect of the present invention, the bicycle rear derailleur according to the seventh aspect is configured so that a mounting space is formed between the first base portion and the second base portion so that the at least one of the motor, the first wireless communication unit, and the electrical connector is mountable to the mounting space.

With the bicycle rear derailleur according to the eighth aspect, it is possible to provide a mounting space between the first base portion and the second base portion so that a component may be mounted in the mounting space. Efficient use of space on the bicycle rear derailleur may be accomplished by providing a mounting space for an electrical component between the first base portion and the second base portion.

In accordance with a ninth aspect of the present invention, the bicycle rear derailleur according to any one of the first aspect to the eighth aspect further comprises a motor speed reducing mechanism configured to be operatively connected to the motor.

With the bicycle rear derailleur according to the ninth aspect, it is possible to enable a reduction of motor speed, thus providing further control of the rear derailleur and shifting mechanism of the bicycle.

In accordance with a tenth aspect of the present invention, the bicycle rear derailleur according to any one of the first aspect to the ninth aspect further comprises a pairing switch configured to communicate with the first wireless communication unit.

With the bicycle rear derailleur according to the tenth aspect, it is possible to implement pairing of the first wireless communication unit with other electronic components.

In accordance with an eleventh aspect of the present invention, the bicycle rear derailleur according to any one of the first aspect to the tenth aspect is configured so that the first wireless communication unit is disposed on one of the base member, the movable member, and the linkage structure. The first wireless communication unit is configured to communicate with a second wireless communication unit mounted to a bicycle electrical operating device.

With the bicycle rear derailleur according to the eleventh aspect, it is possible to send input from a user of the bicycle from a second wireless communication unit that may be in proximity to the user to a first wireless communication unit that may be remote from the user and in proximity to the bicycle rear derailleur. Signals from the user to adjust the bicycle rear derailleur may thus be transmitted wirelessly.

A derailleur control system according to a twelfth aspect of the present invention comprises the bicycle rear derailleur according to any one of the first aspect to the eleventh aspect, a derailleur control unit, and a first wake sensor. The derailleur control unit is configured to control a shifting operation. The first wake sensor is connected to the derailleur control unit so as to cause the derailleur control unit to become operational when the first wake sensor is actuated.

With the derailleur control system according to the twelfth aspect, it is possible to control a shifting operation with the derailleur control unit. At a given time, the derailleur control unit may not be operational in order to save power. The derailleur control unit may be activated by the first wake sensor when the first wake sensor is actuated so that the derailleur control unit may become operational after being in a state of saving power.

A derailleur control system according to a thirteenth aspect of the present invention comprises the bicycle rear derailleur according to any one of the first aspect to the eleventh aspect, a bicycle electrical operating device, a master control unit, a slave control unit, and a second wake sensor. The bicycle electrical operating device generates an input signal when the bicycle electrical operating device is actuated. The master control unit is in operative communication with the bicycle electrical operating device. The master control unit includes a transmitter that transmits a control signal responsive to the input signal. The slave control unit includes a receiver for communicating with the master control unit. The second wake sensor is connected to the bicycle so as to cause the receiver to become operational when the second wake sensor is actuated.

With the derailleur control system according to the thirteenth aspect, it is possible to remotely control the bicycle rear derailleur via a bicycle electrical operating device. Input from the bicycle electrical operating device may be transmitted to the master control unit, transmitter, and receiver at the slave control unit to transmit input from a user to the slave control unit. Power may be saved by the receiver being not operational until an input signal needs to be received, the second wake sensor causing the receiver to become operational when needed. The second wake sensor may be activated at a control signal from the master control unit.

In accordance with a fourteenth aspect of the present invention, a bicycle rear derailleur comprises a base member, a movable member, a linkage structure, and a battery mounting portion. The base member includes a mounting portion configured to be attached to a bicycle frame. The mounting portion has a mounting opening through which a central axis of a hub axle passes in a mounting state of the bicycle rear derailleur. The mounting portion includes a single joint or is free of any joint. The movable member movably couples relative to the base member. The linkage structure operatively connects the movable member to the base member. The battery mounting portion is disposed on at least one of the base member, the movable member, and the linkage structure. The battery mounting portion is configured to detachably mount a battery thereto.

With the bicycle rear derailleur according to the fourteenth aspect, it is possible to mount a bicycle rear derailleur to a bicycle frame with a simplified attachment at the base member compared to a standard mount for a rear derailleur. It is also possible to mount a battery or an electrical connector for the battery on a component of the bicycle rear derailleur for control of electronic components of the bicycle, including electronic derailleur control.

In accordance with a fifteenth aspect of the present invention, the bicycle rear derailleur according to the fourteenth aspect further comprises a battery configured to be detachably mounted to the battery mounting portion.

With the bicycle rear derailleur according to the fifteenth aspect, it is possible to provide a battery on the rear derailleur for control of electronic components of the bicycle, including electronic derailleur control.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8B is a cross-sectional view of a section of FIG. 8A.

DETAILED DESCRIPTION OF EMBODIMENTS

Figure 1:
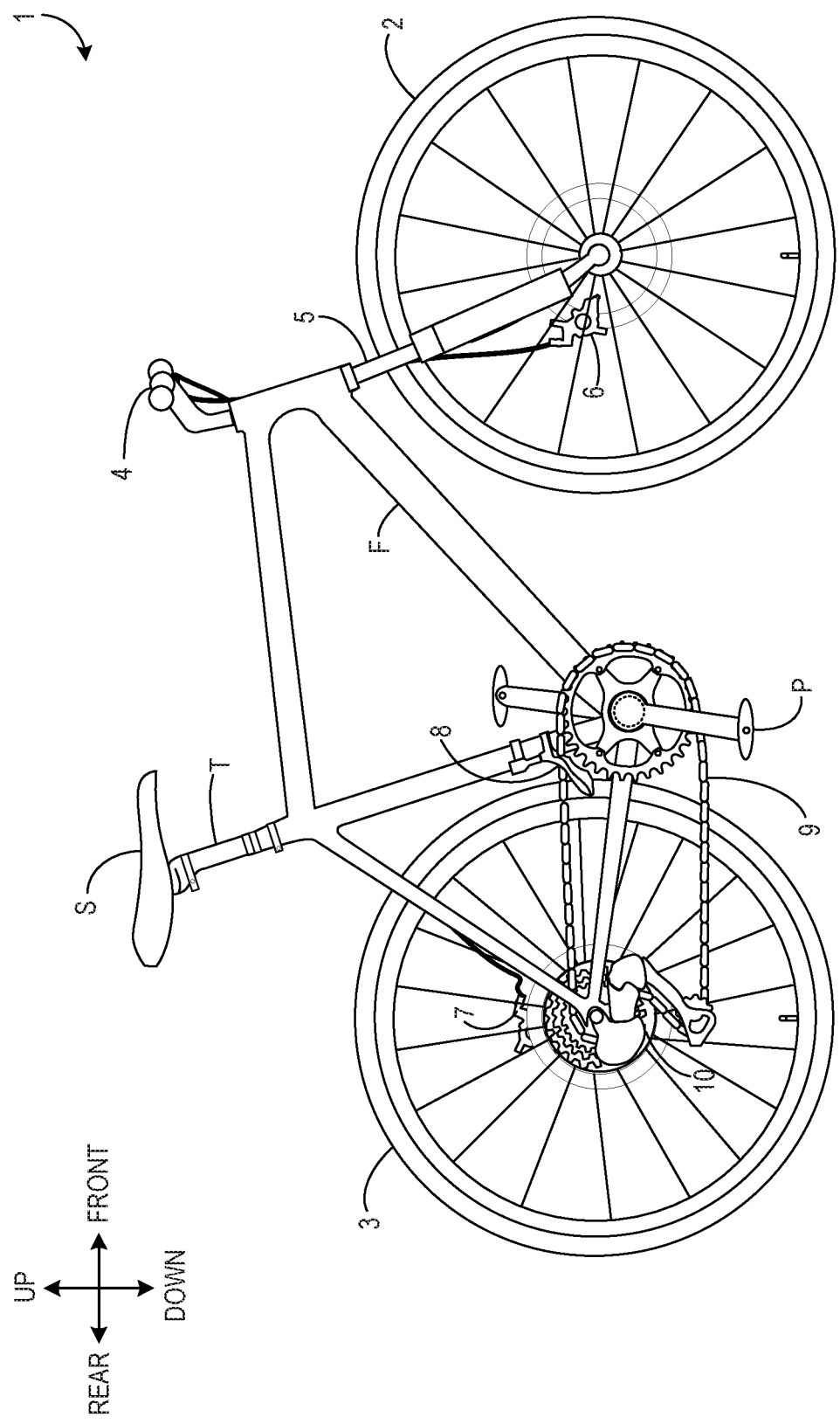
FIG. 1 is a side view of an example bicycle incorporating a bicycle rear derailleur according to the present disclosure.

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

Referring initially to FIG. 1, an exemplary bicycle 1 having a rear derailleur 10 in accordance with a first embodiment is illustrated. The bicycle 1 may be, for example, a road type bicycle. Alternatively, the bicycle 1 may be an off-road bicycle such as a cyclocross bicycle or mountain bike. The bicycle 1 includes front and rear wheels 2 and 3, handlebar 4, front fork 5, front and rear brake devices 6 and 7, front derailleur 8, bicycle chain 9, rear derailleur 10, pedals P attached to crank arms, frame F, and seat post T beneath bicycle seat S. The handlebar 4 may be a drop type handlebar. Alternatively, the handlebar 4 may be a bullhorn type, flat type, or other type of handlebar. A bicycle operating system may be mounted on the handlebar 4 to receive user input from a rider riding the bicycle 1. The brake devices 6, 7 may impart a braking force on one or both of the front and rear wheels 2, 3 in response to the user input. The brake devices 6, 7 may include a hydraulic system for brake control; alternatively, the brake control may include a cable-type brake device or other brake device including rods, etc. The front and rear derailleurs 8, 10 may be configured to enact a gear shift in response to the user input by shifting the chain 9 in a lateral direction of the bicycle 1. A front fork 5 attaches a front wheel 2 to the frame F; engaged with the front fork 5 may be a suspension system SS that may include a damping system and a spring system. Bicycle seat S atop seat post T may be adjustable in height in response to user input; for example, the seat post T may be telescopically adjustable either manually or by electronic control. Pedals P on either side of the bicycle 1 are attached to corresponding crank arms. The crank arms are mounted on either side of the frame F at 180 degrees from one another and are connected by a crank axle. The bicycle 1 of the present embodiment is driven by a chain drive transmission system that includes a bicycle chain 9 engaged with one of a cassette of rear sprockets and a front bicycle sprocket. A driving force applied to the pedals P is transferred to the crank arms, which rotate the crank axle and the bicycle sprocket. As the bicycle sprocket rotates, the bicycle chain 9 is driven around the bicycle sprocket and transmits power to the rear wheel 3 to propel the bicycle 1. Other parts of the bicycle 1 are well known and are not described herein.

Figure 2:
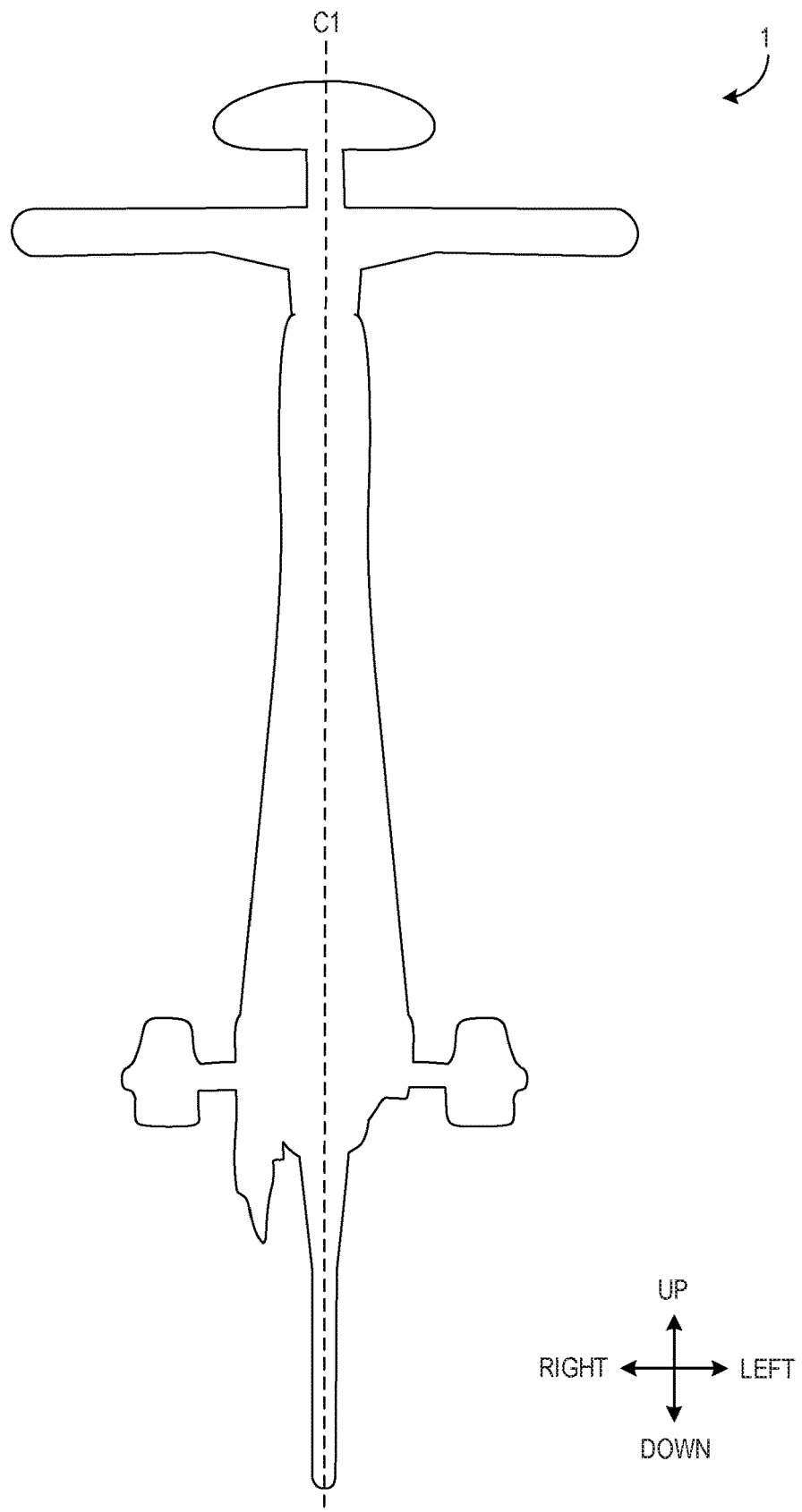
FIG. 2 is an outline of a bicycle along a longitudinal direction showing a bicycle center plane vertical to the bicycle.

As shown in an outline of the bicycle 1 along a longitudinal direction in FIG. 2, the bicycle 1 may have a bicycle center plane C1, the bicycle center plane C1 separating a left side from a right side of the bicycle 1. The following directional terms "front," "rear," "forward," "rearward," "left," "right," "lateral," "longitudinal", "upward," and "downward," as well as any other similar directional terms, refer to those directions which are determined on the basis of a rider sitting upright on a seat S of the bicycle 1 while facing the handlebar 4, for example.

Figure 3:
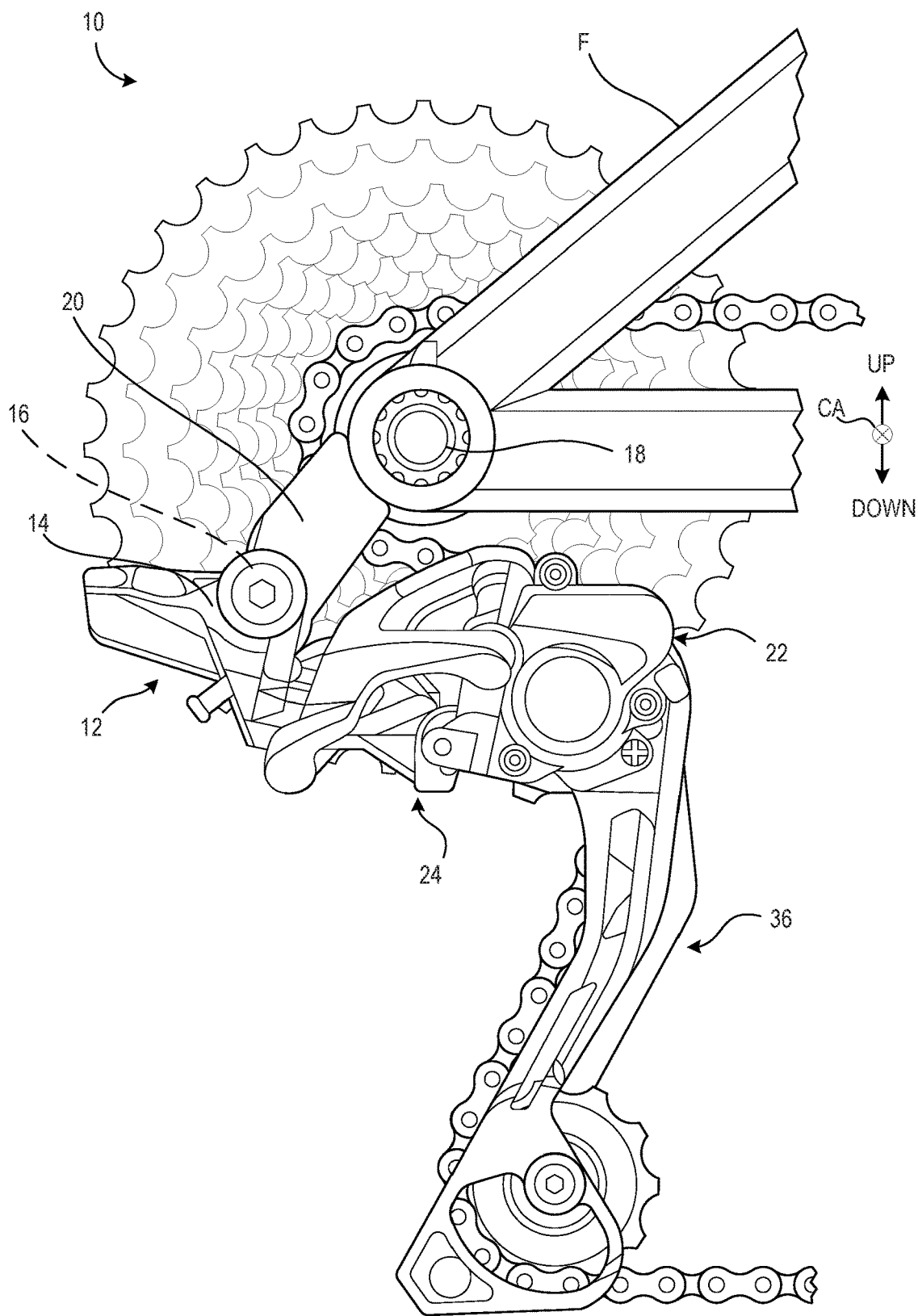
FIG. 3 is a drawing of a bicycle rear derailleur with a mounting portion including a single joint from a side view.

Turning to FIG. 3 in which a first embodiment is depicted, a bicycle rear derailleur 10 is shown. The bicycle rear derailleur 10 includes a base member 12 including a mounting portion 14 configured to be attached to the bicycle frame F. The mounting portion 14 has a mounting opening 16 through which a central axis CA of a hub axle 18 passes in a mounting state of the bicycle rear derailleur 10. The bicycle rear derailleur 10 includes a movable member 22 movably coupled relative to the base member 12. In order to connect the movable member 22 with the base member 12, the bicycle rear derailleur 10 further includes a linkage structure 24 operatively connecting the movable member 22 to the base member 12. As also shown in FIG. 3, the bicycle rear derailleur 10 further includes a chain guide 36 pivotally attached to the movable member 22. A potential advantage of including the mounting portion 14 with the bicycle rear derailleur 10 is that the bicycle rear derailleur components may be securely held below the mounting portion 14, the hub axle 18, and the frame F. As such, sufficient space may be maintained between a foot of a bicycle rider and the bicycle rear derailleur 10.

Figure 4:
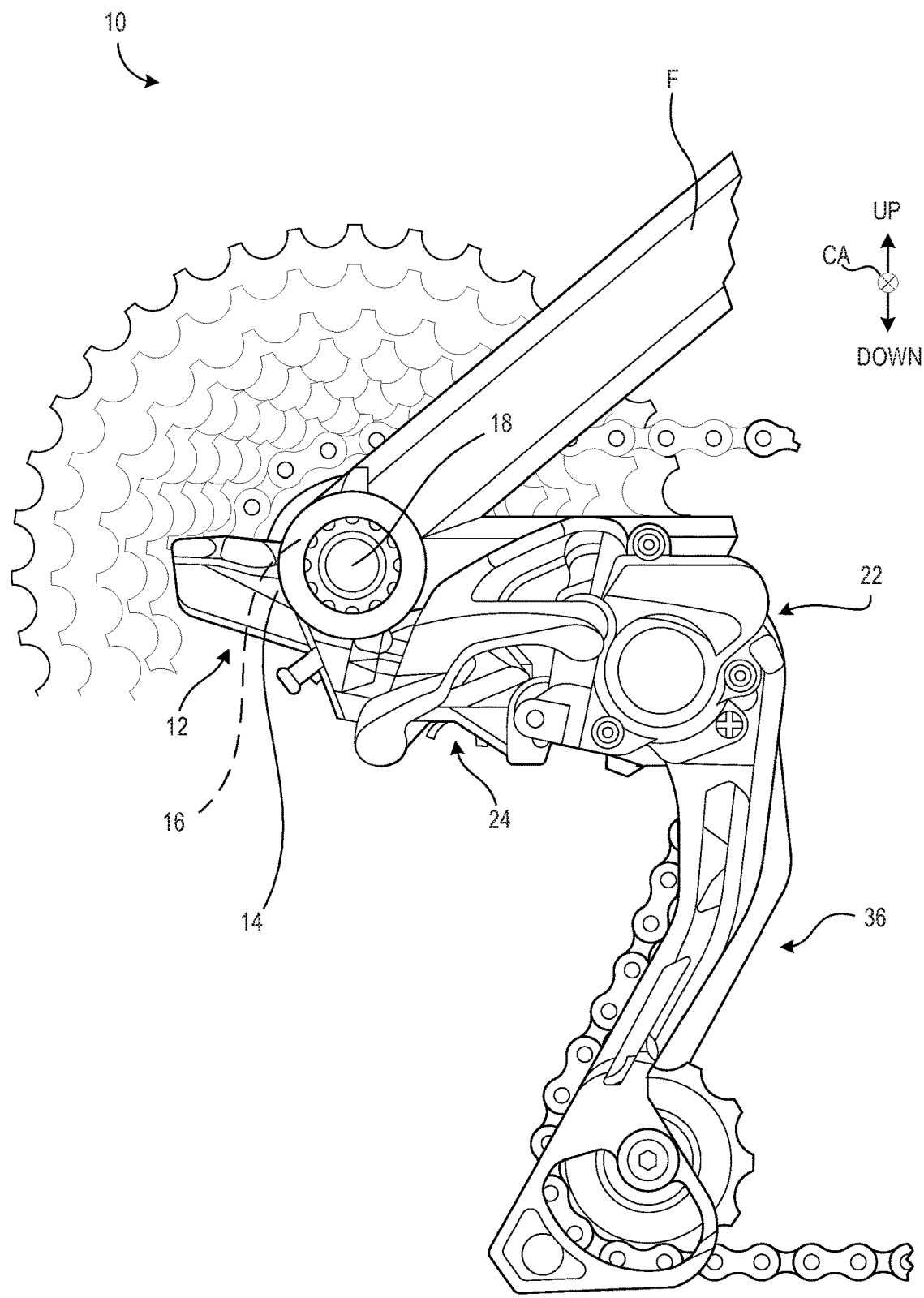
FIG. 4 is a drawing of a bicycle rear derailleur with a mounting portion that is free of any joint from a side view.
Figure 5B:
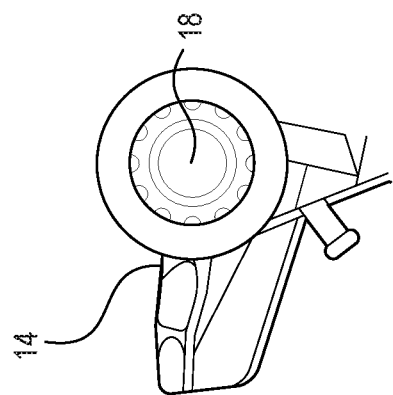
FIGS. 5A and 5B each show an enlarged view of the mounting portion including a single joint and a mounting portion that is free from any joint, respectively.
Figure 5A:
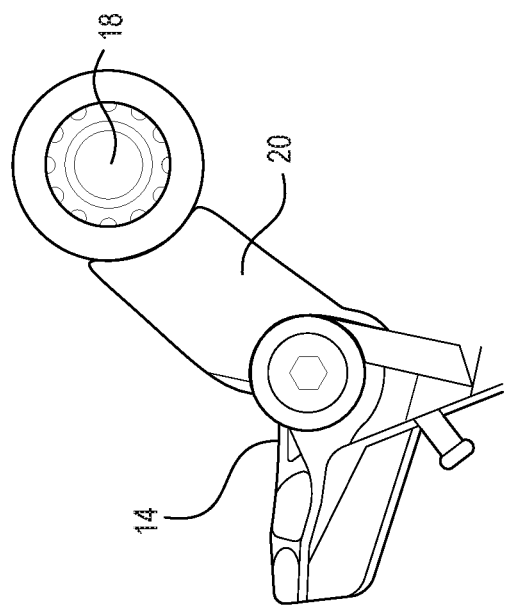

The mounting portion 14 includes a single joint 20 or is free of any joint. While FIG. 3 displays the bicycle rear derailleur 10 with a joint 20 as included in the mounting portion 14, FIG. 4 shows the structures described above of the bicycle rear derailleur 10 but with the mounting portion 14 being free of any joint 20. FIG. 5A shows an enlarged view of mounting portion 14 with a joint 20, while FIG. 5B depicts an enlarged view of mounting portion 14 without the joint 20. Without a joint 20, the mounting portion 14 may be armless. A joint 20 in the mounting portion 14 may fix the bicycle rear derailleur 10 in a preferred position.

In the following paragraphs, arrangements of components included with the bicycle rear derailleur 10 are discussed with reference to FIGS. 6A-6C, 8A and 8B, and FIGS. 9A-9D. The bicycle rear derailleur 10 further includes at least one of a motor 26, a first wireless communication unit 28, and an electrical connector 30. The at least one of the motor 26, the first wireless communication unit 28, and the electrical connector 30 are disposed on at least one of the base member 12, the movable member 22, and the linkage structure 24. A battery mounting portion 32 is formed on at least one of the base member 12, the movable member 22, and the linkage structure 24. The bicycle rear derailleur 10 also includes a battery 34 configured to be disposed on the battery mounting portion 32. The battery 34 and the electrical connector 30 are interchangeably disposed on the battery mounting portion 32. The bicycle rear derailleur 10 further includes a controller 42 configured to control at least one of the motor 26 and the first wireless communication unit 28. The bicycle rear derailleur 10 further includes a motor speed reducing mechanism 54 configured to be operatively connected to the motor 26. The first wireless communication unit 28 is disposed on one of the base member 12, the movable member 22, and the linkage structure 24. The first wireless communication unit 28 is configured to communicate with a second wireless communication unit 58 mounted to a bicycle electrical operating device 60, as discussed below. FIGS. 6A-6C, 8A, and 8B show arrangements of these components on the base member 12, while FIGS. 9A-9D show arrangements of these components on the linkage structure 24 and movable member 22.

Figure 6C:
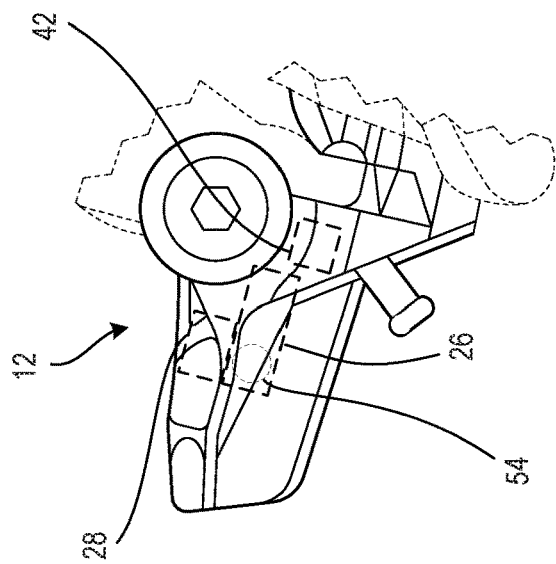
FIGS. 6A-6C show the base member of the bicycle rear derailleur of the present disclosure.
Figure 6B:
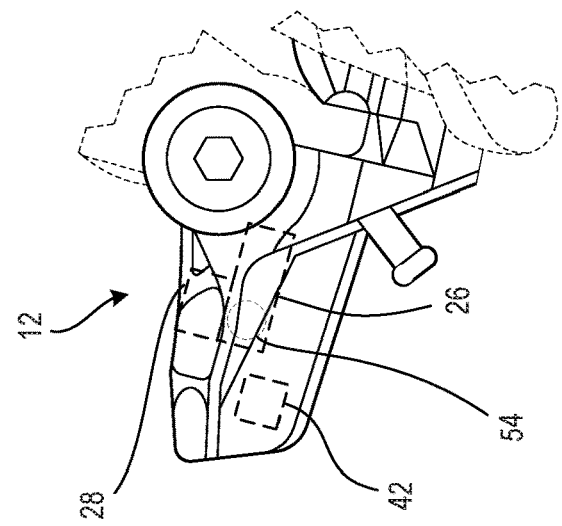
Figure 6A:
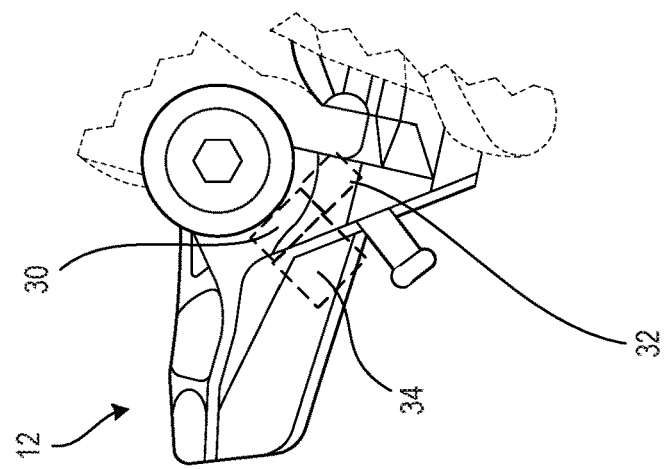
Figure 7A:
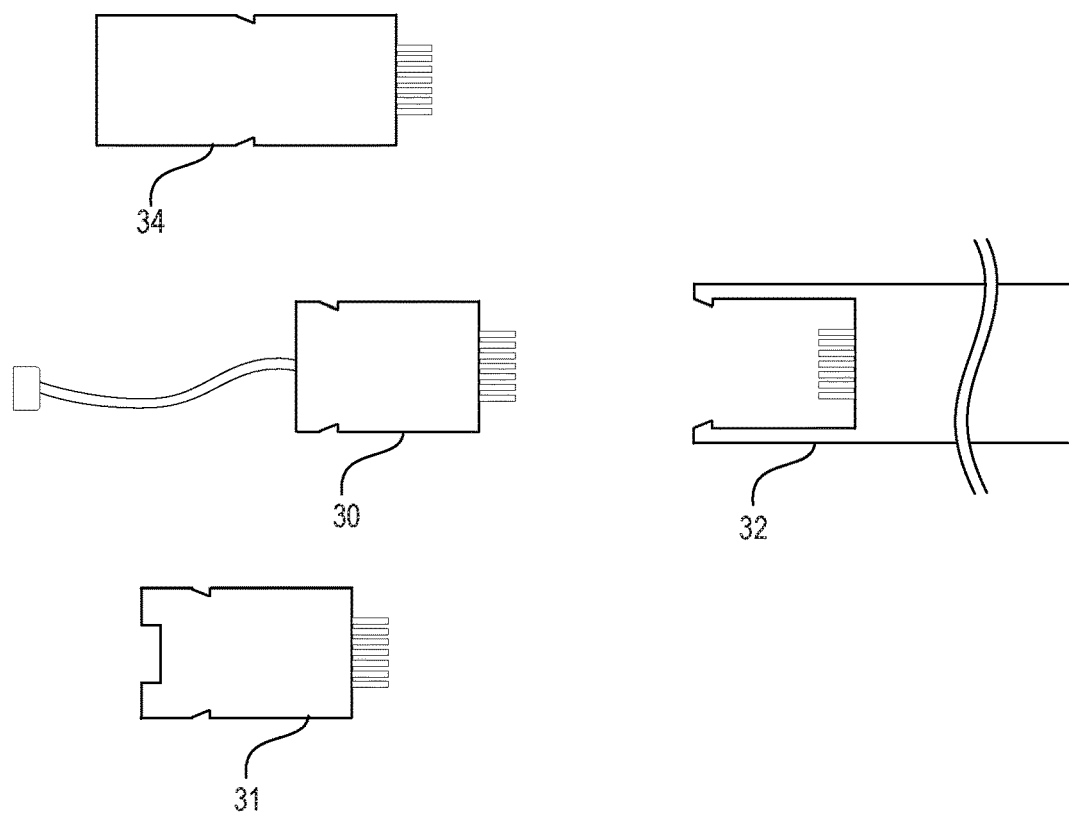
FIGS. 7A and 7B show implementations of the battery mounting portion, battery, and electrical connector.
Figure 7B:
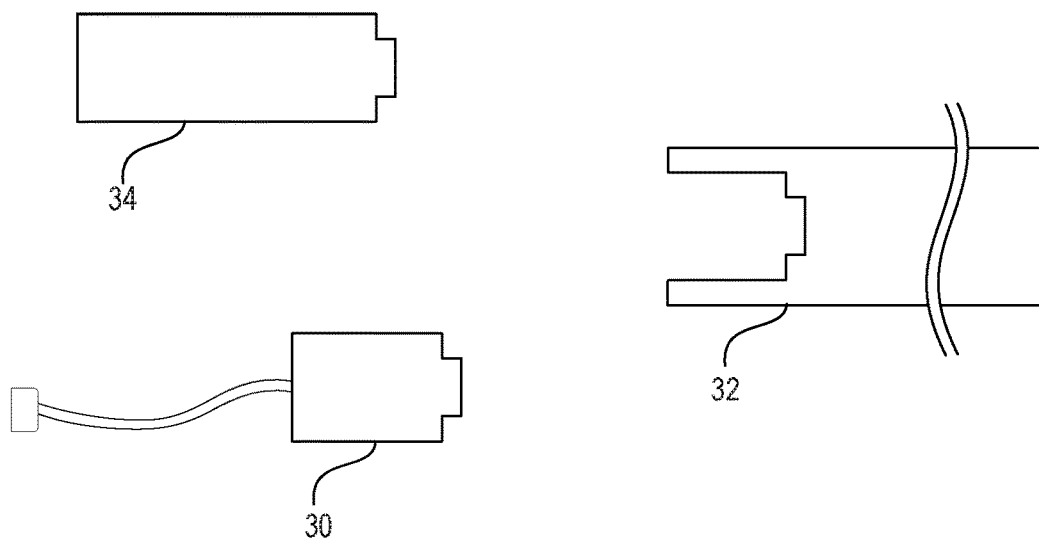

Beginning with FIGS. 6A-6C, FIG. 6A shows an arrangement where the battery 34 and the electrical connector 30 may be placed interchangeably on the base member 12 at the battery mounting portion 32. Possible arrangements of the battery mounting portion 32 and the electrical connector 30 are given in FIGS. 7A and 7B. In FIG. 7A, the battery mounting portion 32 includes a conductive portion that may interface with the electrodes of a battery 34, or may alternatively interface with the electrically conductive structures, e.g., pins, of an electrical connector 30. The electrical connector 30 may be a USB port electrical connector 31 that includes electrically conductive structures at one end to interface with the battery mounting portion 32 and a USB port at a free end of the USB electrical connector 31. The USB port may connect with, for example, a battery that includes a USB port connection. FIG. 7B shows a USB-type battery mounting portion 32 that includes a USB port. In this implementation, a battery 34 including a USB port connection may interface with the USB-type battery mounting portion 32. Alternatively, the electrical connector 30 may include a USB port connection to connect with the USB port at the USB-type battery mounting portion 32. Given these arrangements, it will be appreciated that the battery 34 and the electrical connector 30 may be interchangeably disposed on the battery mounting portion 32.

Returning to FIG. 6A, the battery 34 or the electrical connector 30 may be disposed at a position on the rear derailleur 10 at the battery mounting portion 32. In one implementation the electrical connector 30 may be mounted at the battery mounting portion 32 to connect with a battery 34 that is remote from the rear derailleur 10. As discussed above, a USB port may be included at the battery mounting portion 32 or on the electrical connector 30. The battery 34 may power the electrical devices and components of the bicycle 1, such as a computer, an electronic front derailleur 8, and/or a drive unit that may be used in an assist mode for driving the bicycle 1. FIG. 6B gives an arrangement where the motor 26, motor speed reduction mechanism 54, controller 42, and first wireless communication unit 28 are placed on the base member 12. As shown, the motor unit includes the motor 26 and motor speed reduction mechanism 54. Also, the first wireless communication unit 28 is shown as disposed in the motor unit. A similar configuration is given in FIG. 6C, however in this case the first wireless communication unit 28 is placed inside the base member 12 whereas in FIG. 6B the first wireless communication unit 28 is placed outside the base member 12.

Figure 8B:
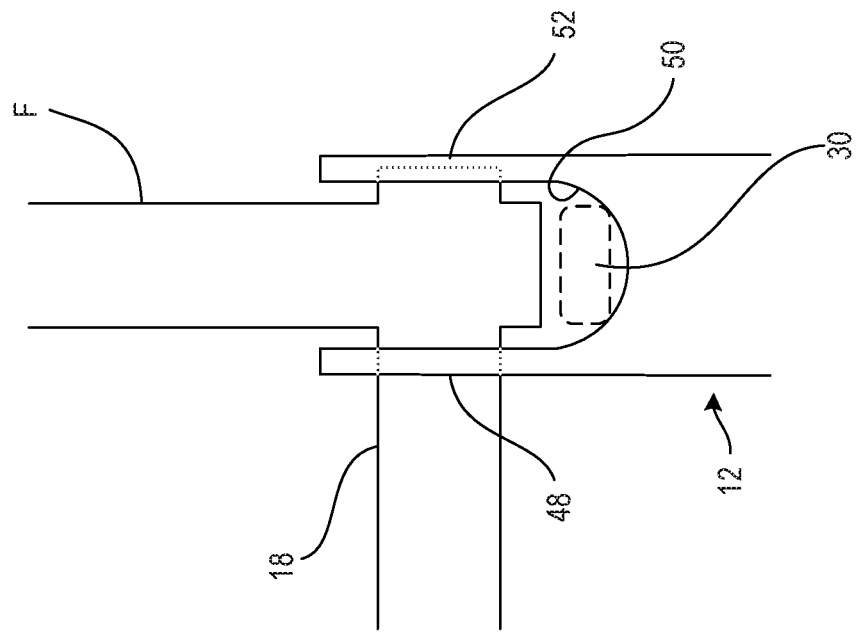
FIGS. 8A and 8B show views of a mounting portion and the base member of the bicycle rear derailleur of the present disclosure, where
Figure 8A:
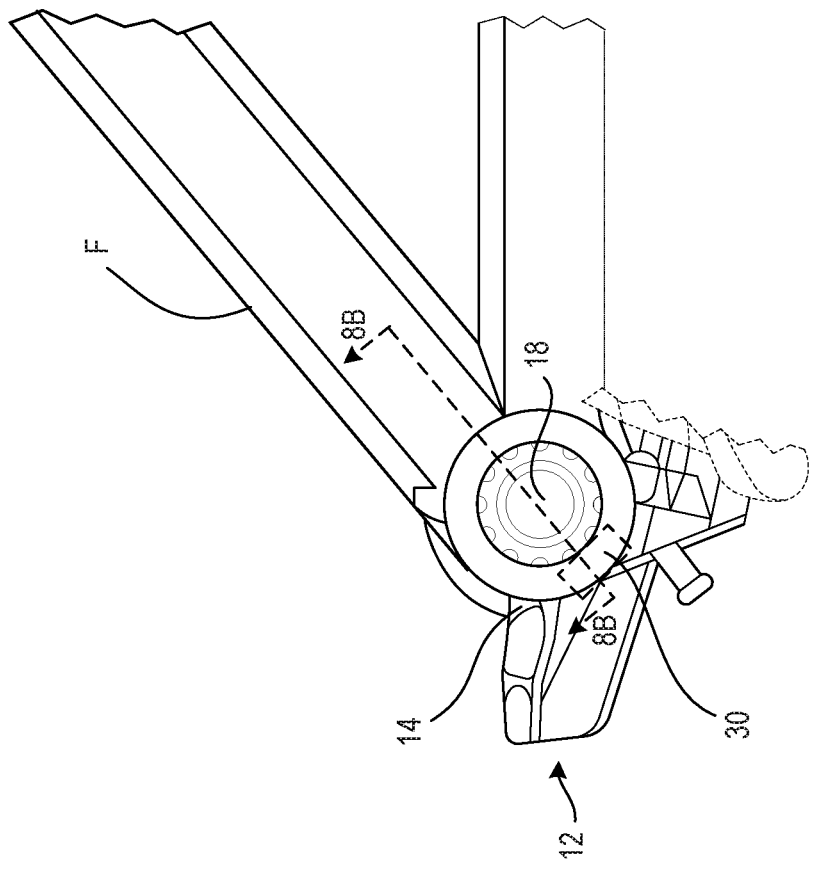

FIGS. 8A and 8B show views of a mounting portion 14 and the base member 12 of the bicycle rear derailleur 10, where FIG. 8B is a cross-sectional view through line 8B shown in FIG. 8A. FIG. 8B shows the mounting portion 14 including a first base portion 48 and a second base portion 52 spaced apart from a first base portion 48. As shown in FIG. 8B, the first base portion 48 and the second base portion 52 are at either side of the intersection of the hub axle 18 and the bicycle frame F. This configuration, as shown in FIG. 8A, is a direct mounting of the rear derailleur 10 via the mounting portion 14 to the bicycle frame F, without a joint 20. A mounting space 50 is formed between the first base portion 48 and the second base portion 52 so that the at least one of the motor 26, the first wireless communication unit 28, and the electrical connector 30 is mountable to the mounting space 50. In FIGS. 8A and 8B, the electrical connector 30 is shown in the mounting space 50, however it will be appreciated that alternatively the first wireless communication unit 28 and/or the motor 26 may be placed in the mounting space 50.

Figure 9A:
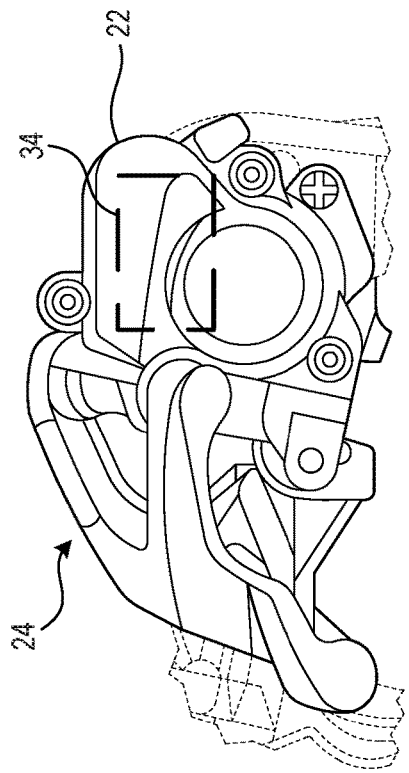
FIGS. 9A-9D show the linkage structure of the bicycle rear derailleur of the present disclosure.
Figure 9B:
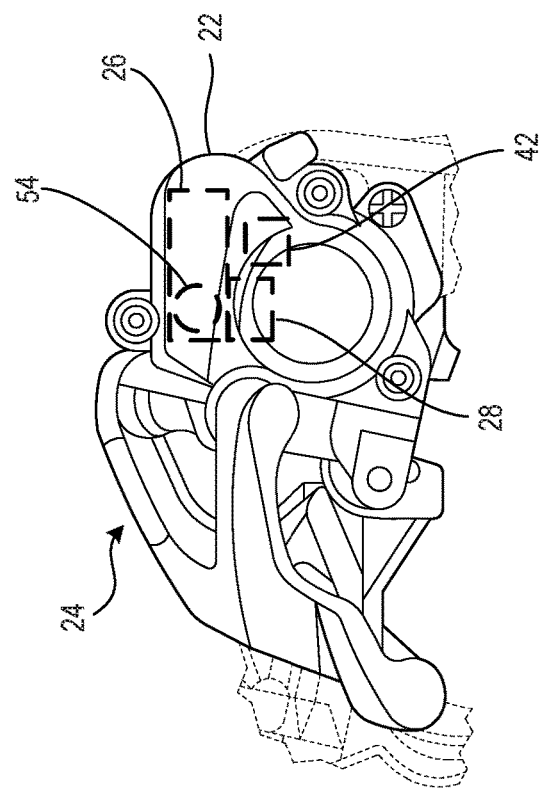
Figure 9C:
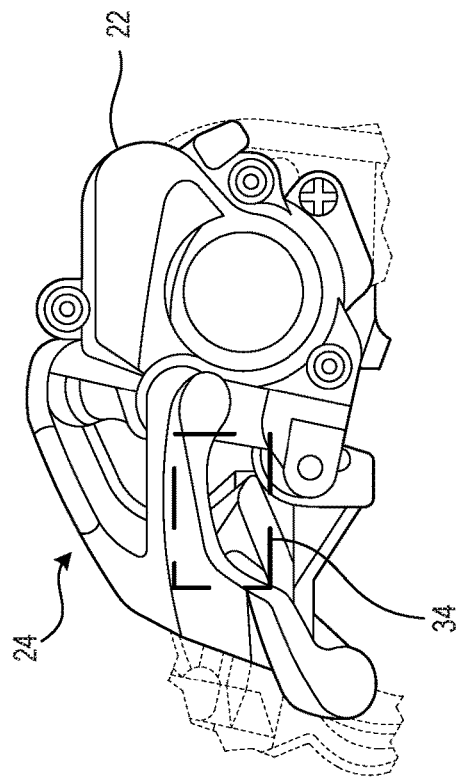
Figure 9D:
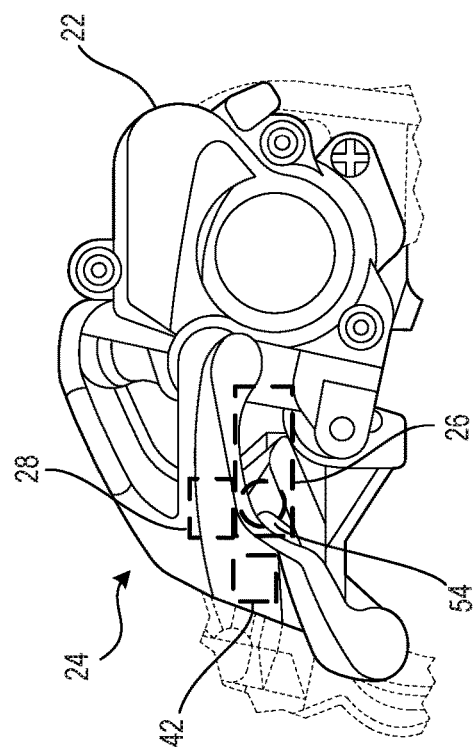

FIGS. 9A to 9D illustrate the linkage structure 24 of the bicycle rear derailleur 10. Similarly to FIGS. 6A to 6C, arrangements of the components discussed above are given, however here the components are shown as arranged on the linkage structure 24 and/or the movable member 22. FIG. 9A shows a battery 34 included in the linkage structure 24. FIG. 9B shows the battery 34 instead placed in the movable member 22. The motor 26, motor speed reduction mechanism 54, first wireless communication unit 28, and controller 42 are placed in the linkage structure 24 in FIG. 9C. In FIG. 9D, the motor 26, motor speed reduction mechanism 54, first wireless communication unit 28, and controller 42 are placed in the movable member 22. It will be appreciated that various combinations of these arrangements are possible. For example, if the battery 34 is placed in the linkage structure 24, the motor 26, the motor speed reduction mechanism 54, first wireless communication unit 28, and controller 42 may be placed in the movable member 22. In a second example, if the motor 26, motor speed reduction mechanism 54, first wireless communication unit 28, and controller 42 are placed in the base member 12 as shown in FIG. 6C, the battery 34 may be placed in either the linkage structure 24 or the movable member 22 as shown in FIGS. 9A and 9B, respectively. In any of these examples, the first wireless communication unit 28 may be placed near to or apart from the motor 26. Also, the first wireless communication unit 28 may be placed within the bicycle rear derailleur 10 as shown in, for example, FIG. 9C or outside of the bicycle rear derailleur 10 as shown, for example, in FIG. 6A.

Figure 10:
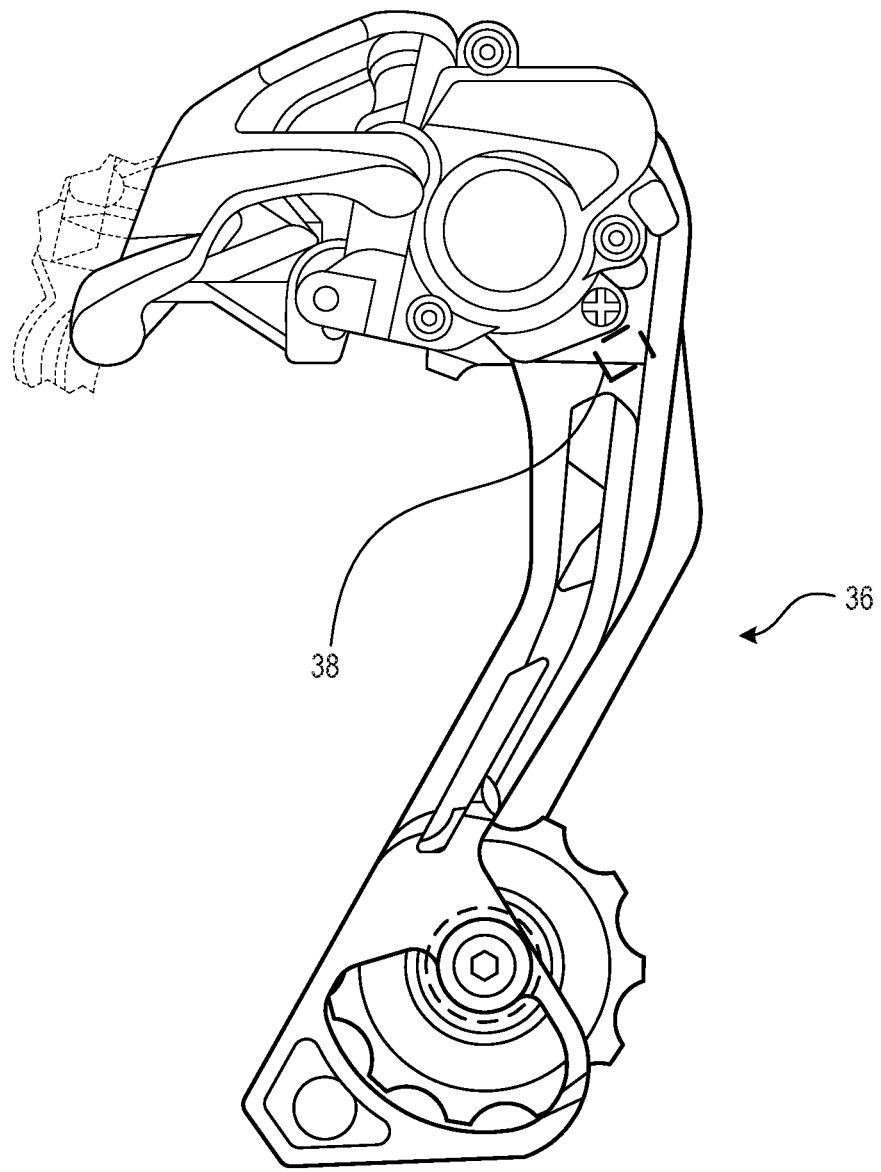
FIG. 10 shows a chain guide of the bicycle rear derailleur of the present disclosure.

FIG. 10 shows a chain guide 36 of the bicycle rear derailleur 10. As shown, the bicycle rear derailleur 10 further includes a sensor 38 configured to detect a position of the chain guide 36 relative to the movable member 22. The sensor 38 may include rotary encoders or potentiometers. In this case, the sensor 38 may be disposed around the movable member 22 and the pivot axle 40 of the chain guide 36 and detect the rotational amount of the chain guide 36 relative to the movable member 22. The sensor 38 may be configured to detect at least one of a cadence resulting from operation of the bicycle 1, an inclination, a velocity, and/or an acceleration.

Figure 11:
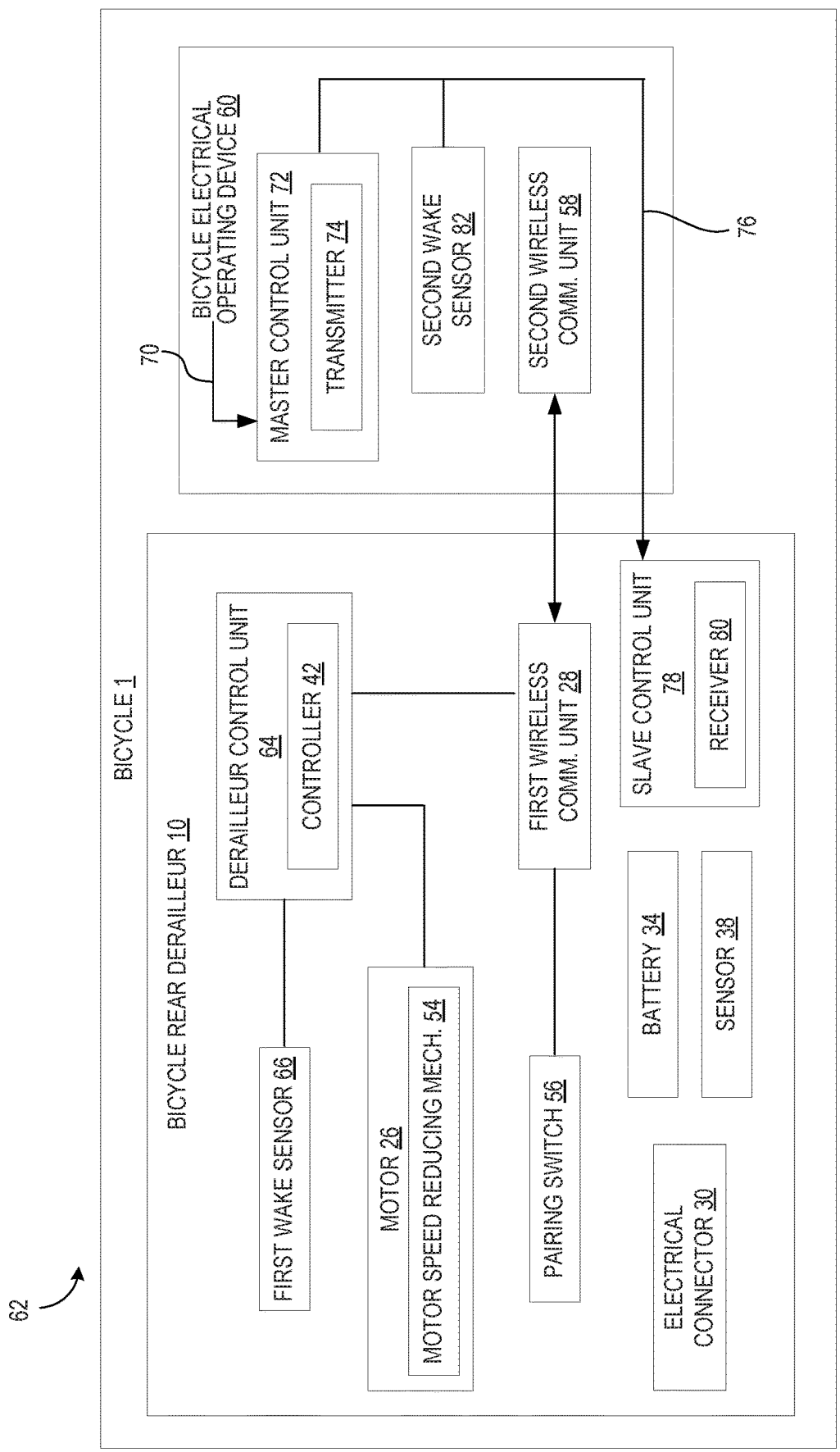
FIG. 11 is a schematic showing a derailleur control system including the electrical components of the bicycle rear derailleur and a bicycle electrical operating device of the present disclosure.
Figure 12:
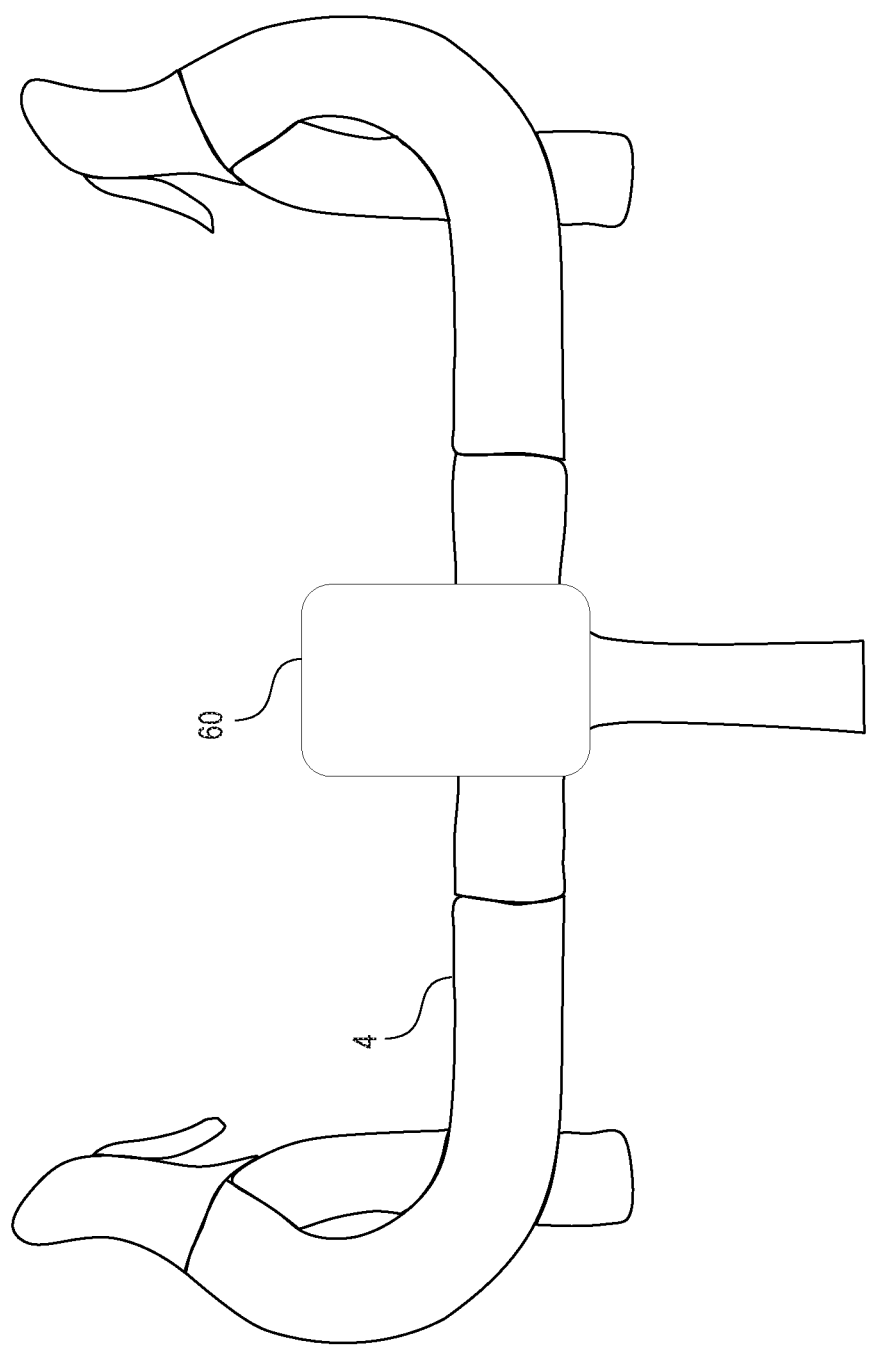
FIG. 12 shows handlebars of a bicycle including a bicycle electrical operating device of the present disclosure.

FIG. 11 is a schematic showing a derailleur control system 62 including the electrical components of the bicycle rear derailleur 10 and a bicycle electrical operating device 60 of the bicycle 1. FIG. 12 shows handlebars 4 of the bicycle 1 including the bicycle electrical operating device 60. It will be appreciated that the bicycle electrical operating device 60 may be mounted to the handlebars 4, the frame F, or other parts of the bicycle 1 as suitable. The bicycle electrical operating device 60 may include at least one of a lever of a shifting device, a switch for operating an electrical component of the bicycle 1, and/or a controller that may be used for an automatic shifting system that controls the rear derailleur 10. Returning to FIG. 11, the derailleur control system 62 includes the bicycle rear derailleur 10. The derailleur control system 62 further includes a derailleur control unit 64 configured to control a shifting operation. The derailleur control system 62 further includes a first wake sensor 66 connected to the derailleur control unit 64 so as to cause the derailleur control unit 64 to become operational when the first wake sensor 66 is actuated. In FIG. 11, the controller 42 is shown as included in the derailleur control unit 64. Also connected to the derailleur control unit 64 is the motor 26 and the motor speed reducing mechanism 54. The controller 42 may control the motor 26 depending on the operation of the bicycle electrical operating device 60 in an operational state, which receives input from a rider of the bicycle 1. The motor speed reducing mechanism 54 enables reduction of motor speed and may provide control of the rear derailleur 10 to improve control of the shifting mechanisms of the bicycle 1. The first wireless communication unit 28 is connected to the derailleur control unit 64. The bicycle rear derailleur 10 further includes a pairing switch 56 configured to communicate with the first wireless communication unit 28. Pairing of the first wireless communication unit 28 with other electronic components may thus be controllable. The battery 34 and sensor 38 are shown as included in the bicycle rear derailleur 10 in FIG. 11. The first wireless communication unit 28 is configured to communicate with a second wireless communication unit 58, which in FIG. 11 is shown as included in the bicycle electrical operating device 60.

The derailleur control system 62 including the bicycle rear derailleur 10 further includes the bicycle electrical operating device 60 for generating an input signal 70 when the bicycle electrical operating device 60 is actuated. The derailleur control system 62 further includes a master control unit 72 as shown in FIG. 11 in operative communication with the bicycle electrical operating device 60, the master control unit 72 including a transmitter 74 that transmits the control signal 76 responsive to the input signal 70. The derailleur control system 62 further includes a slave control unit 78 including a receiver 80 for communicating with the master control unit 72, at the rear derailleur 10. The derailleur control system 62 further includes a second wake sensor 82 connected to the bicycle 1 so as to cause the receiver 80 to become operational when the second wake sensor 82 is actuated. The second wake sensor 82 may become activated when the second wake sensor 82 receives a control signal 76 emitted from the master control unit 72. Depending on the input signal 70 generated by the bicycle electrical operating device 60, the second wake sensor 82 may cause the receiver 80 to become operational. The second wake sensor 82 may, when activated, cause the receiver 80 to become operational depending on the operation of the bicycle electrical operating device 60.

It will be appreciated that the controller 42 may control the first wireless communication unit 28 to emit a signal to a third wireless communication unit (not shown) which may be arranged at the bicycle front derailleur 8. Specifically, the second wireless communication unit 58 may not directly transmit a control signal 76, which may, for example, include a shifting signal, to the third wireless communication unit. If the control signal 76 includes a front derailleur shifting signal, the first wireless communication unit 28 may transmit the control signal 76 to the third wireless communication unit after the first wireless communication unit 28 receives the control signal 76 emitted from the second wireless communication unit 58.

According to another example, a bicycle rear derailleur 10 includes a base member 12 including a mounting portion 14 configured to be attached to a bicycle frame F. The mounting portion 14 has a mounting opening 16 through which a central axis CA of a hub axle 18 passes in a mounting state of the bicycle rear derailleur 10. The mounting portion 14 includes a single joint 20 or is free of any joint. The bicycle rear derailleur 10 further includes a movable member 22 movably coupled relative to the base member 12. The bicycle rear derailleur 10 further includes a linkage structure 24 operatively connecting the movable member 22 to the base member 12. The bicycle rear derailleur 10 further includes a battery mounting portion 32 disposed on at least one of the base member 12, the movable member 22, and the linkage structure 24. The battery mounting portion 32 is configured to detachably mount a battery 34. The bicycle rear derailleur 10 further includes a battery 34 configured to be detachably mounted to the battery mounting portion 32.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. When a combination of features is described with language such as "A and/or B" or "at least one of A and B" herein, this will be understood to mean either or both of the features A and B. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalent.

The invention claimed is:

1. A bicycle rear derailleur comprising:
 a base member including a mounting portion configured to be attached to a bicycle frame, the mounting portion having a mounting opening through which a central axis of a hub axle passes in a mounting state of the bicycle rear derailleur, the mounting portion including a single joint or being free of any joint;
 a movable member movably coupled relative to the base member;
 a linkage structure operatively connecting the movable member to the base member; and
 at least one of a motor, a first wireless communication unit, and an electrical connector, wherein
 the mounting portion includes a first base portion and a second base portion spaced apart from the first base portion; and
 a mounting space is formed between the first base portion, the second base portion, and the bicycle frame so that the at least one of the motor, the first wireless communication unit, and the electrical connector is mountable to the mounting space.

2. The bicycle rear derailleur according to claim 1, wherein
a battery mounting portion is formed on at least one of the base member, the movable member, and the linkage structure.

3. The bicycle rear derailleur according to claim 2, further comprising:
a battery configured to be disposed on the battery mounting portion.

4. The bicycle rear derailleur according to claim 3, wherein
the battery and the electrical connector are interchangeably disposed on the battery mounting portion.

5. The bicycle rear derailleur according to claim 1, further comprising:
a chain guide pivotally attached to the movable member; and
a sensor configured to detect a position of the chain guide relative to the movable member.

6. The bicycle rear derailleur according to claim 1, further comprising:
a controller configured to control at least one of the motor and the first wireless communication unit.

7. The bicycle rear derailleur according to claim 1, further comprising:
a motor speed reducing mechanism configured to be operatively connected to the motor.

8. The bicycle rear derailleur according to claim 1, further comprising:
a pairing switch configured to communicate with the first wireless communication unit.

9. The bicycle rear derailleur according to claim 1, wherein
the first wireless communication unit is disposed on one of the base member, the movable member, and the linkage structure; and
the first wireless communication unit is configured to communicate with a second wireless communication unit mounted to a bicycle electrical operating device.

10. A derailleur control system comprising:
the bicycle rear derailleur according to claim 1;
a derailleur control unit configured to control a shifting operation; and
a wake sensor connected to the derailleur control unit so as to cause the derailleur control unit to become operational when the wake sensor is actuated.

11. A derailleur control system comprising:
the bicycle rear derailleur according to claim 1;
a bicycle electrical operating device for generating an input signal when the bicycle electrical operating device is actuated;
a master control unit in operative communication with the bicycle electrical operating device, the master control unit including a transmitter that transmits a control signal responsive to the input signal;
a slave control unit including a receiver for communicating with the master control unit; and
a wake sensor connected to the bicycle so as to cause the receiver to become operational when the wake sensor is actuated.

12. The bicycle rear derailleur according to claim 1, wherein the at least one of the motor, the first wireless communication unit, and the electrical connector is disposed onto the mounting space.

13. A bicycle rear derailleur comprising:
a base member including a mounting portion configured to be attached to a bicycle frame, the mounting portion having a mounting opening through which a central axis of a hub axle passes in a mounting state of the bicycle rear derailleur, the mounting portion including a single joint or being free of any joint;
a movable member movably coupled relative to the base member;
a linkage structure operatively connecting the movable member to the base member; and
a battery mounting portion configured to detachably mount a battery thereto, wherein
the mounting portion includes a first base portion and a second base portion spaced apart from the first base portion; and
a mounting space is formed between the first base portion, the second base portion, and the bicycle frame so that the battery is mountable to the mounting space.

14. The bicycle rear derailleur according to claim 13, further comprising:
the battery configured to be detachably mounted to the mounting space of the battery mounting portion.

15. A bicycle rear derailleur comprising:
a base member including a mounting portion configured to be attached to a bicycle frame, the mounting portion having a mounting opening through which a central axis of a hub axle passes in a mounting state of the bicycle rear derailleur, the mounting portion including a single joint or being free of any joint;
a movable member movably coupled relative to the base member;
a linkage structure operatively connecting the movable member to the base member;
at least one of a first wireless communication unit and an electrical connector being disposed on at least one of the base member, and the linkage structure; and
a motor being disposed on at least one of the movable member and the linkage structure.

* * * * *